O. D. COLLIS.
CAMP BROILER.
APPLICATION FILED JUNE 14, 1913.

1,091,877.

Patented Mar. 31, 1914.
2 SHEETS—SHEET 1.

O. D. COLLIS.
CAMP BROILER.
APPLICATION FILED JUNE 14, 1913.
1,091,877.
Patented Mar. 31, 1914.
2 SHEETS—SHEET 2.
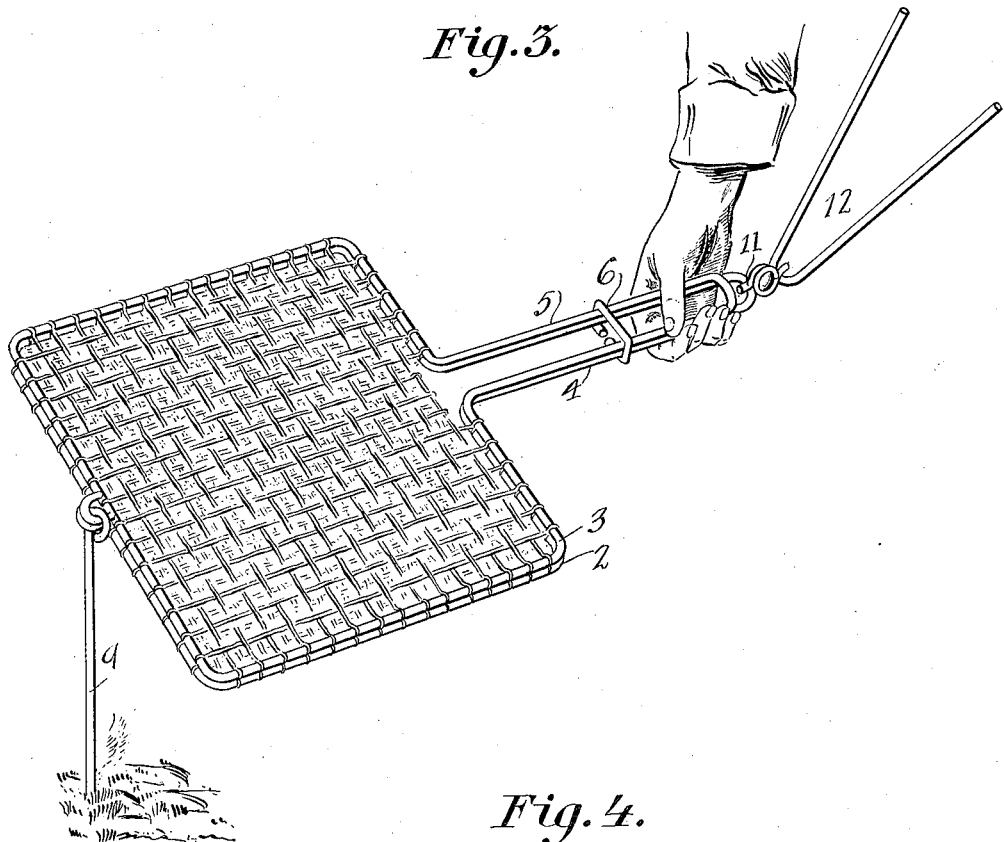
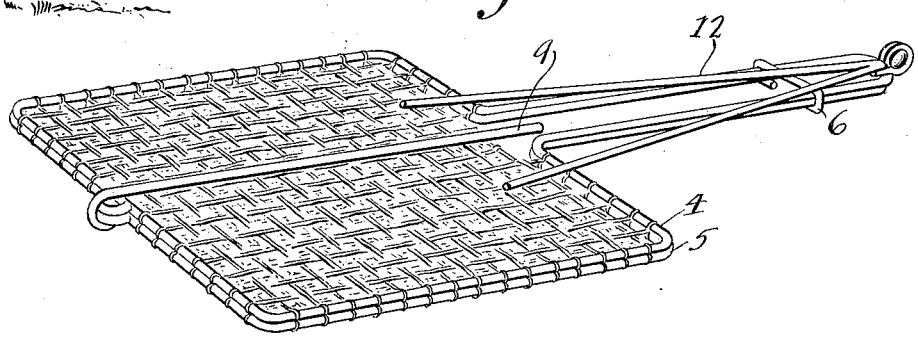
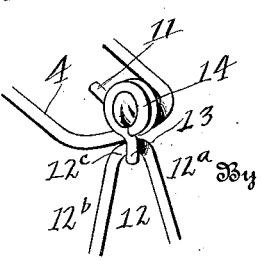
Witnesses
Philip E. Barnes
Frank A. Kane
Inventor
Oliver D. Collis
By Edmund H. Parry
Attorney

UNITED STATES PATENT OFFICE.

OLIVER D. COLLIS, OF CLINTON, IOWA, ASSIGNOR TO THE COLLIS COMPANY, OF CLINTON, IOWA, A CORPORATION OF IOWA.

CAMP-BROILER.

1,091,877. Specification of Letters Patent. Patented Mar. 31, 1914.

Application filed June 14, 1913. Serial No. 773,728.

*To all whom it may concern:*

Be it known that I, OLIVER D. COLLIS, a citizen of the United States, residing at Clinton, in the county of Clinton and State of Iowa, have invented certain new and useful Improvements in Camp-Broilers, of which the following is a specification, reference being had therein to the accompanying drawing.

This invention relates to camp structures and particularly to cooking utensils.

The object of the invention is to provide a cooking utensil, such as a broiler, with means for supporting the same over a fire and in such manner that the same will be afforded all necessary rigidity and yet include simple and comparatively few parts.

In a structure characterized by my invention, there are, in one aspect thereof, included supporting instrumentalities which, in conjunction with the broiler itself, constitute a tripod.

The invention, in another aspect, includes a broiler provided at one portion with support-attaching means adapted to connect with a suitable supporting-member; and at another portion, the broiler is provided with a two-armed supporting-instrumentality pivotally connected to the broiler and adapted to have a pivotal movement thereon.

In still another aspect, the invention includes a broiler provided at one end with support-attaching means to which is loosely connected a pointed supporting-member adapted to be projected into the ground; the broiler being provided at another portion with a two-armed supporting-instrumentality pivotally connected to the broiler, these two supporting-instrumentalities being adapted to be folded over upon the broiler to constitute a compact portable structure.

The invention also resides in certain novel details of construction and arrangement of parts, all as more fully described hereinafter and claimed.

In the accompanying drawings, I have illustrated one embodiment of my invention, it being understood that the same is susceptible of considerable modification without departing from the spirit of the invention.

Figure 1:
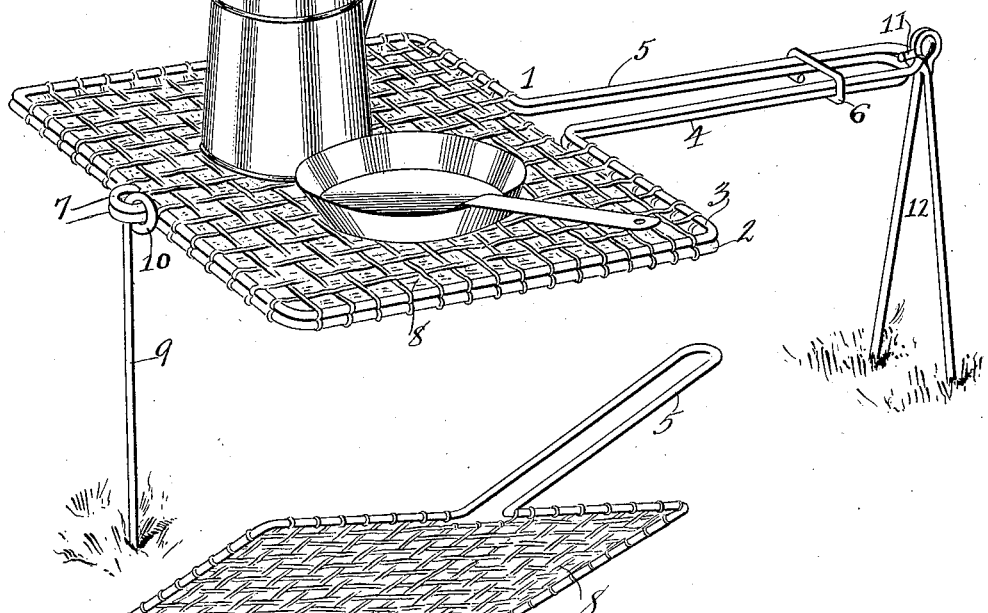
Figure 2:
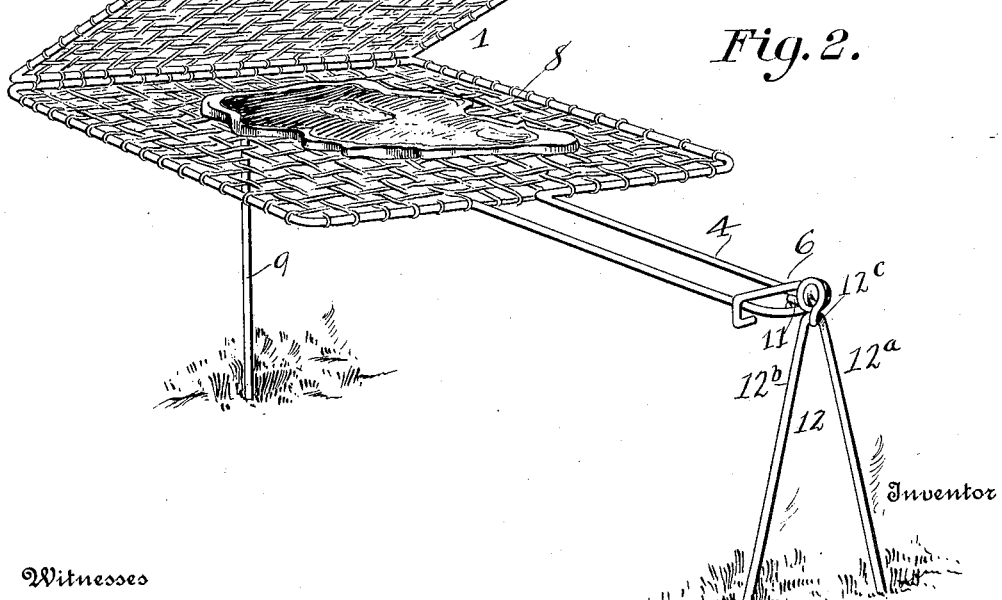

In these drawings: Figure 1 is a view in perspective of a broiler with my improved form of supporting-instrumentalities attached thereto, the structure being shown in operative position over a fire; Fig. 2 is a similar view, showing the broiler-members separated; Fig. 3 is a similar view, showing the same about to be turned to present the opposite side of the structure over the fire; and Fig. 4 is a similar view thereof, with the parts folded together for transportation.

In the drawings, the numeral 1 designates, generally, a broiler which, in this instance, comprises two separate members 2 and 3 having handle-portions 4 and 5 of relatively different length, as usual. On the lower handle-portion, there is slidably mounted a clip 6 which encompasses the upper handle-portion and whereby the two handle-portions are held together.

Each of the broiler-members is formed of a frame which, in this instance, is shown as practically square. This frame is extended to form the handle-portions, aforementioned, and is, at a point opposite the handle-portion formed with a circular loop 7. The loops of the two broiler-members are in close juxtaposition relatively to provide support-attaching means, as will presently be explained. Mounted on each of the broiler-members 2 and 3 is a mesh structure 8.

Means are provided for supporting the broiler in an approximately horizontal position over a fire: These means include, for one portion of the broiler, a single supporting-instrumentality which, in this instance, is shown as a metallic post 9 pointed at its lower end and provided at its upper end with an eye 10 adapted to engage in both of the loops 7. The loops and eye are so formed and aggrouped that the member 9 is adapted to lie upon the broiler member 3 when the parts are folded as shown in Fig. 4. For supporting the handle-portion of the structure, a somewhat different form of means is provided: To this end, the handle 4 of the broiler member 2 is provided with a pivot element 11 which is formed integral therewith or otherwise secured thereto. Adapted to be movably secured to this element 11 is a supporting-instrumentality 12 comprising two arms $12^a$ and $12^b$, and a lug 13 formed integral with or otherwise rigidly secured to the member 12, at the juncture of the two arms $12^a$ and $12^b$, the lug being provided with an eye 14 to receive a rivet which extends through the pivot portion of the element 11. Preferably and as shown, the lug 13 is only of such length that the apex $12^c$ of the two converging arms $12^a$ and $12^b$ occupies a position in approximate alinement with the end of the handle 4 which acts to limit movement of said instrumentality 12. On the other hand, the pivot element 11 occupies a position sufficiently above the plane of the handle 4 as to permit said supporting-instrumentality 12 to be folded down upon the handle 5 of the broiler member 3, as shown in Fig. 4, when the structure is to be packed for transportation or storing.

The structure is, of course, adapted to be turned whenever it is desired or necessary to dispose toward the fire that side which has been uppermost. This may be accomplished in the manner illustrated in Fig. 3: The pointed post 9 is left in the ground, but the two-armed instrumentality 12 is tilted so that it will occupy, say, the position shown in said Fig. 3. The user may then, by hand, turn the structure on its pivot—formed by the eye 10 and the loops 7—and, thus, reverse its position. In broiling a steak, for instance, first one side and then the other can, by this mode of operation, be presented to the fire; and this without necessity of the operator having to withdraw the post 9.

From the foregoing, it will be seen that, in this instance, I have provided a portable broiler provided with means (permanently attached thereto) for supporting the same over the ground; and that the parts of the structure are so arranged relatively and are so formed that the broiler and the supporting-instrumentalities constitute what I may term a tripod.

Having thus described my invention, what I claim is:

1. A camp broiler, including in combination, a pair of frames formed with handles of relatively different length and provided with support-attaching loops; and a tripod support therefor including a single member attached to said loops and forming a hinge for the said frames and a support for one end of the broiler, and a two-armed supporting-instrumentality pivotally attached to one of the handle-portions.

2. A camp broiler, including in combination, a pair of frames provided with handles of relatively different length and with loops; a supporting-instrumentality extending through said loops and forming with said loops a hinge for the frame; and a two-armed supporting-instrumentality pivotally secured to the handle-portion of one of the frames and foldable upon the handle-portion of the other frame.

3. A camp broiler, including in combination, a pair of frames each provided with a handle and with a loop, one of the handles being shorter than the other, and the loops being arranged in juxtaposition; a hinge element extending through said loops and elongated to form a broiler-support; a second broiler-support including two diverging arms, means for connecting the same to one of the handle-portions and comprising a lug provided with an eye and attached to said supporting-instrumentality at the apex of said arms, and a pivot element attached to one of the handles and extending above the plane thereof whereby the point of connection between it and the supporting-instrumentality is a substantial distance above the plane of said handle to permit said supporting-instrumentality to be folded over upon the broiler frames.

In testimony whereof I affix my signature in presence of two witnesses.

O. D. COLLIS.

Witnesses:
CARL C. FEDDUSEN,
FRIEDA E. SRITSCHLER.

Copies of this patent may be obtained for five cents each, by addressing the "Commissioner of Patents, Washington, D. C."